United States Patent [19]

Drummond

[11] Patent Number: 5,063,767
[45] Date of Patent: Nov. 12, 1991

[54] APPARATUS FOR CONTROLLING TIME GAPS BETWEEN BILLETS IN ROLLING MILLS

[76] Inventor: José A. C. Drummond, BR 040 -RM 769 - Dias Tavares, Juiz De Fora- Minas Gerais, Brazil

[21] Appl. No.: 349,492

[22] Filed: May 9, 1989

[30] Foreign Application Priority Data

May 10, 1988 [BR] Brazil .............................. PI8802266

[51] Int. Cl.5 ............................................. B21B 37/00
[52] U.S. Cl. .......................................... 72/11; 72/13; 72/14; 72/19; 72/202
[58] Field of Search ................. 72/11, 12, 14, 19, 200, 72/202, 249, 13

[56] References Cited

U.S. PATENT DOCUMENTS

| 4,373,364 | 2/1983 | Tanimoto et al. ................. 72/200 X |
| 4,485,652 | 12/1984 | Shoji et al. .......................... 72/202 X |
| 4,589,268 | 5/1986 | Sakurada et al. ................... 72/202 X |

FOREIGN PATENT DOCUMENTS

| 3426698 | 5/1985 | Fed. Rep. of Germany .......... 72/14 |
| 41-21327 | 12/1966 | Japan ....................................... 72/14 |
| 55-40055 | 3/1980 | Japan ....................................... 72/14 |
| 61-13884 | 4/1986 | Japan ....................................... 72/14 |
| 545402 | 3/1977 | U.S.S.R. ............................... 72/202 |
| 599869 | 3/1978 | U.S.S.R. ............................... 72/202 |
| 1018738 | 5/1983 | U.S.S.R. ............................... 72/202 |

Primary Examiner—E. Michael Combs
Attorney, Agent, or Firm—Anthony A. O'Brien

[57] ABSTRACT

A system and device for enabling the control of time intervals between billets in rolling mills of blocks or billets and/or similar equipments that allow such control is implemented using sensor controlled electronic circuits.

The control system relies on a signal indicator which indicates to a mill operator the proper moment at which a billet has to be introduced in the first stand of the rolling mill. By observing a preset time interval and a real time interval indicator between billets, an effective time interval control technique for establishing an ideal spacing between billets minimizes the spacing gap guaranteeing, among other benefits, a significative increase in rolling mill productivity.

5 Claims, 4 Drawing Sheets

APPARATUS FOR CONTROLLING TIME GAPS BETWEEN BILLETS IN ROLLING MILLS

BACKGROUND AND SUMMARY OF THE INVENTION

The present invention relates generally to a system and device for controlling time intervals between billets or blocks in rolling mills and/or similar equipment which allows such control. The system consists of a signal which indicates the moment at which a billet has to be introduced into the first stand of the rolling mill by an operator observing preset time interval and a real time interval indicator between billets.

In the present state of technology, the time interval between billets occurs largely without control; i.e., it depends on the observation and experience of an operator who withdraws the coke billets and works at the control pulpit located at the furnace output area. As the pulpit operator cannot see the billet tail end coming out from the first stand because the first stand itself obstructs the operator's vision field, there is a mirror to help him. But this is not a really effective aid since the operator has to determine a random reference point located between the first and second stand. When the tail reaches that point he will have to introduce a new billet into the first stand. However, this point of reference changes according to the speed of the rolling mill, and from operator to operator. This is because the operator has neither precise information as to when he has to introduce a new billet, nor feedback of the real time interval. So, he is limited by these two factors and consequently there is a loss in rolling mill productivity.

To minimize these variations and limitations and to obtain an increase in productivity, a system and device was developed to make a control of the time intervals possible. This system was originally idealized to work in two strand rolling mills, but it can be applied to rolling mill of any number of strands.

Therefore, the primary advantages of the present invention as compared to the current state of known technology are: (1) an increase in rolling mill productivity due to the shorter time intervals between billets undergoing processing; (2) fully effective space control between billets to be rolled; (3) flexibility to change the space/interval between billets by observing variables, such as differences in mechanical properties in the materials being rolled, or in other production matters.

BRIEF DESCRIPTION OF THE DRAWINGS

Additional objects and advantages of the invention will become apparent to those skilled in the art as the description proceeds with reference to the accompanying drawings wherein.

DETAILED DESCRIPTION OF THE PREFERRED EMBODIMENT

Figure 1:
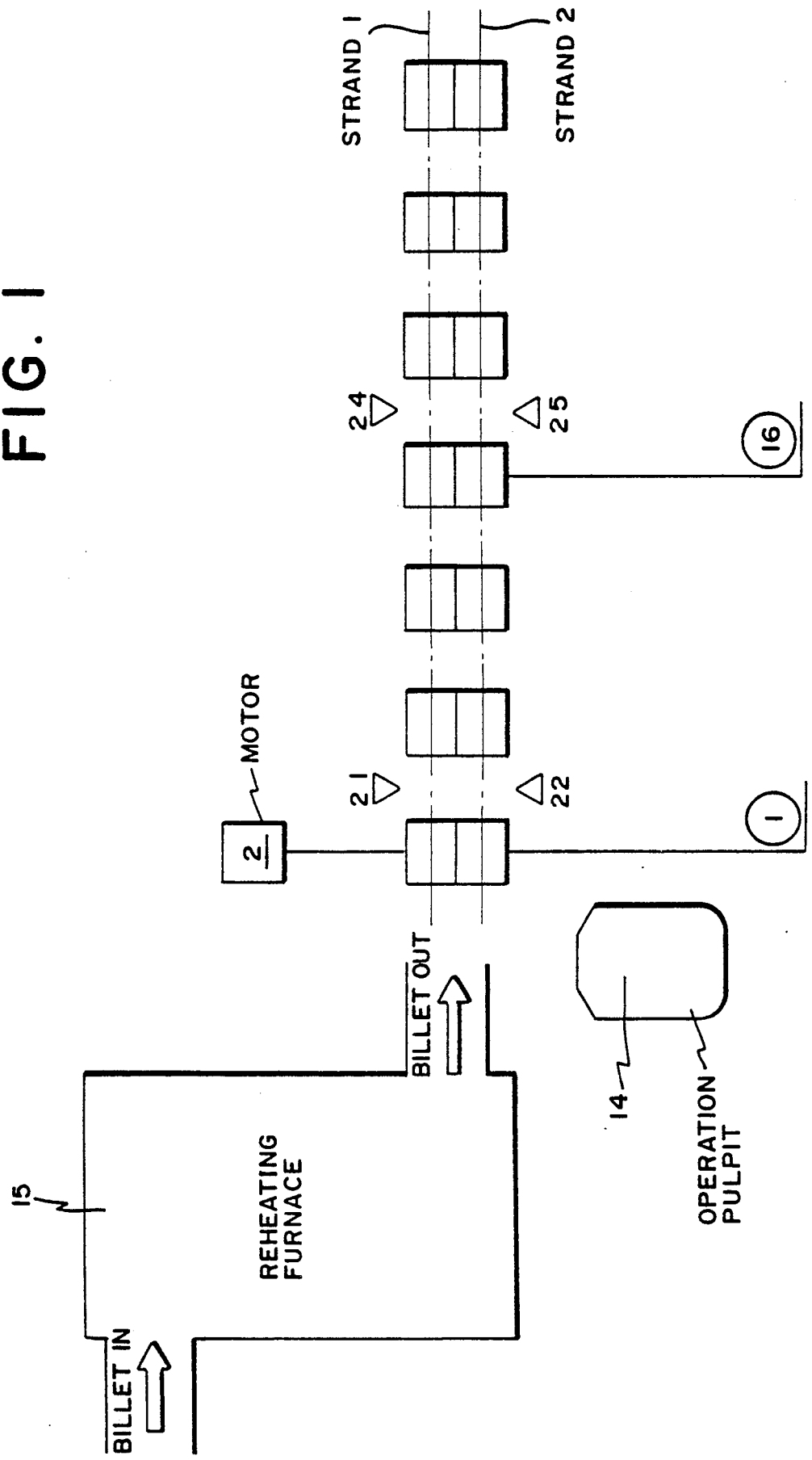
FIG. 1 is a simplified schematic diagram of a rolling mill in which the present system for controlling the spacing between billets is advantageously employed.

Referring now to FIG. 1, there is shown a simplified schematic diagram of a rolling mill arranged for control by the billet interval control system according to the present invention. The rolling mill components include a billet reheating furnace 15 from which heated billets are routed via an output section to a series of work stands. Note that the rolling mill includes seven work stands, illustratively, with the first stand designated as 1, and the fourth stand designated as 16. Note also that all of the stands can process two billets, illustratively, in paths designated as strand 1, and strand 2. A drive motor 2 moves the billets along one of two parallel strand paths, shown as strands 1 and 2, under control of a mill operator stationed in an operation pulpit 14. The billets are routed to a first stand 1, downstream of which are positioned hot metal detectors (HMD) 21 and 22. HMD 21 is associated with strand 1; HMD 22 with strand 2. Downstream of a fourth stand 16 are positioned HMD 24 and 25, associated with strands 1 and 2 respectively.

Figure 2:
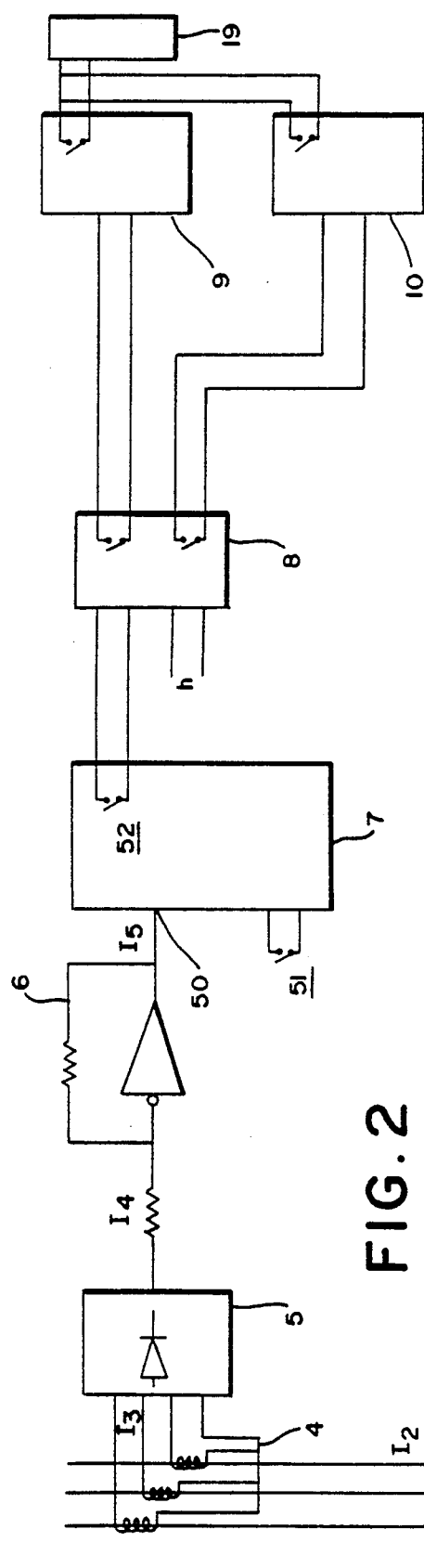
FIG. 2 is a block diagram of the system for enabling control of the time intervals between billets in a rolling mill, according to the present invention.

Referring now to FIG. 2, there is shown a block diagram of the interval control systems wherein the drive motor 2 draws DC current $I_1$ from an AC-DC converter 3. Load variations on the motor shaft produce variations in the DC current $I_1$, which are reflected back into the input AC currents $I_2$. Current transformers 4 reduce the input AC currents $I_2$ into stepped down AC currents $I_3$, which are rectified and smoothed out by an electronic rectifier 5 into a rectified motor current signal $I_4$. This motor current $I_4$ signal is amplified by operational amplifier (op amp) 6 into amplified motor current signal $I_5$ which is applied to the input of a current comparator/analyzer circuit 7. As described in detail below in connection with FIG. 5, the current comparator/analyzer circuit 7 "reads" the amplified current signal $I_5$; "memorizes it"; and subsequently compares the memorized value with a new reading. Briefly, when the current $I_5$ rises above a predetermined percentage value relative to the memorized one during a period of time greater than a preset interval in seconds, the control system declares that a billet has entered the first stand of the rolling mill of FIG. 1. This declaration cycle will be repeated whenever a current $I_5$ rising above the predetermined percentage memorized value occurs. Conversely, the current comparator/analyzer circuit 7 will also sense a current decrease corresponding to the exit of a billet from one of the strands of the first stand 1. Similarly, after a preset time in seconds, this current comparator/analyzer circuit 7 will again memorize the current $I_5$ value for later comparison.

The position of an output contact 52 of circuit 7 is defined after each comparison. Output contact 52 remains opened when there is a predetermined percentage rise of current $I_5$ value, which characterizes the entrance of a billet in the first stand 1. Output contact 52 remains closed when there is a predetermined percentage decrease of the current $I_5$ value, which characterizes the exit of a billet from the first stand 1. Actuation of an external reset control 51 will also cause contact 52 to open. A strand selector circuit 8 verifies the billet exit to begin the time interval count in timer circuit 9 or 10, corresponding to the respective strand after the exit; or in response to the external habilitation reset by control "h". The strand selector circuit 8 can operate in either a manual or an automatic mode.

Figure 3:
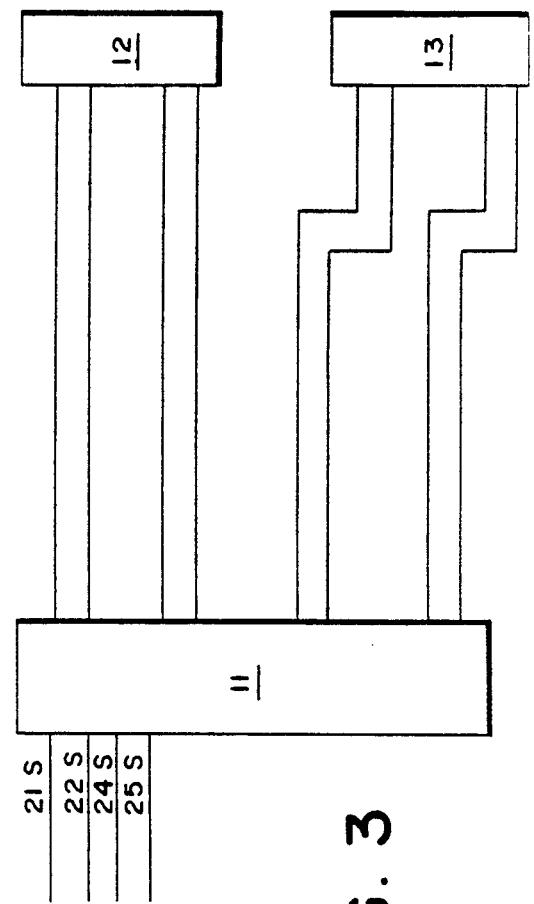
FIG. 3 is a simplified block diagram showing selection of the real time intervals in a two strand rolling mill.

The timers 9 and 10 (one for each strand) are preset according to the time interval desired between billets, and also according to feedback provided by chronometers 12 and 13 of FIG. 3. The timer circuit 9 may, for example, be associated with events related to strand 1 of the rolling mill, while the timer circuit 10 may be associated with events of strand 2. The chronometers 12 and 13 are located in the pulpit !4 and measure real elapsed time intervals. When the preset time interval has expired, a signaling device 19 in the pulpit area is activated, which advises the mill operator that he has to introduce a new reheated billet into the work stands. This signaling device 19 receives information from the gap interval timers 9 and 10, and indicates to the operator a desired moment for the introduction of a billet from the output of the reheating furnace 15 into the first stand 1.

Figure 4:
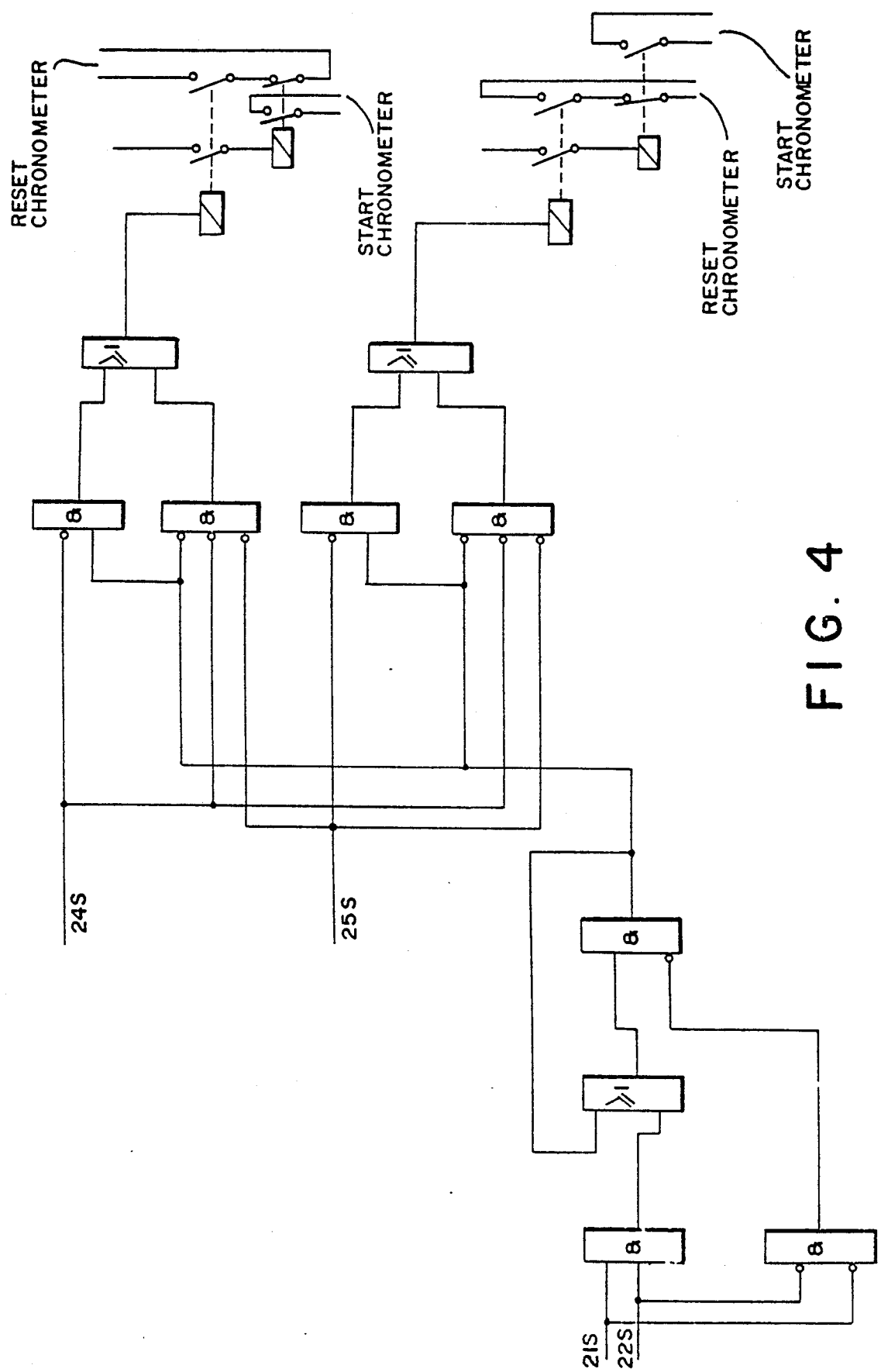
FIG. 4 is a detailed block diagram of the programmable logic controller of FIG. 3.

Referring now to FIGS. 3 and 4, a Programmable Logical Controller (PLC) 11 selects and enables the chronometers 12 and 13, one for each strand, to start the counting of the real elapsed time intervals between billets. The chronometer 12 may, for example, be associated with events related to strand 1 of the rolling mill, while the chronometer 13 may be associated with the events of strand 2. PLC 11 receives information signals 21S, 22S, 24S and 25S from their corresponding Hot Metal Detectors 21, 22, 24 and 25 of FIG. 1. Two of these sensors, 21 and 22, are located after the fourth stand 16. For ease of description, the terms sense and detect will be used interchangeably in this section. The purpose of the sensors 21 and 22 is to detect and indicate if there is a billet in one of the strands or in both. If there is a billet in just one strand, the PLC 11 will enable one of the two chronometers 12 or 13 to show the real time interval between billets of that strand. If there is a billet in just one of the strands, the PLC 11 will enable the two chronometers 12 and 13 to show the real time interval between billets of the strand. If there are billets in both strands, the chronometers 12 and 13 will show individually, the real time interval between billets of each strand. The purpose of the sensors 24 and 25 is to set to zero, start and stop the counting of time. When one of the sensors 24 or 25 does not detect a billet, the PLC 11 sends a command to the chronometer 12 and 13 to set to zero and start the counting of time. When one of the sensors 24 or 25 detects the head end of the coming billet, the PLC 11 sends a command to the chronometer 12 or 13 to stop the counting of time.

Figure 5:
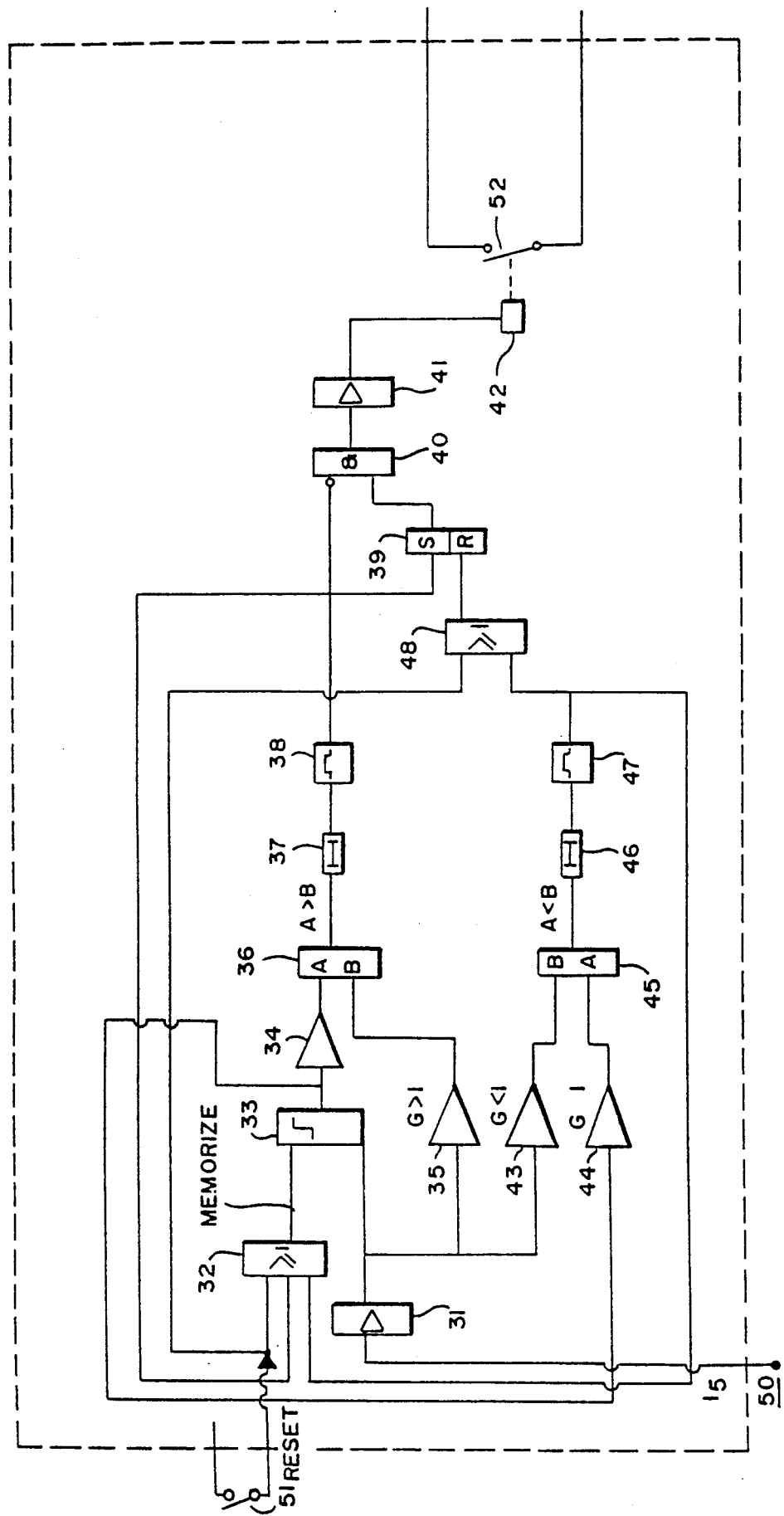
FIG. 5 is a detailed block diagram of the current comparator/analyzer circuit of FIG. 2.

The device for controlling the time interval between billets in rolling mills, is the current comparator/analyzer circuit 7 (or sensor device of DC motor current $I_1$) and is more fully described as follows with reference to FIG. 5. The circuit of FIG. 5 has an input 50 for the amplified motor current signal $I_5$, and an input 51 for reset or external inhibition. An operational amplifier 31 allows use of the information coming from the DC converter of the first stand 1 of the rolling mill, without causing any interference in the converter system. There is a filter (not shown) included in this op amp 31 whose purpose is to flatten the amplified current signal $I_5$ to avoid peak values which would defeat the system in case of low loads on the motor shaft. These current peaks are normal and exclusively dependent on the AC-DC converter 3.

Output from an OR gate 32 serves as input to the several control signals, which determines when the memorization of the new current $I_5$ value sampling from the first stand 1 must be done. Its output enables the sample and hold, or memorizing circuit 33 to "sample and hold" or "read" a current $I_5$ sampling, and maintain its output unchanged so that it can be used as a basis of comparison. The moment of sampling is determined by the output of OR gate 32. A level and switching detector circuit 34 supervises the output signal generated by the memorizing circuit 33. When the sampled $I_5$ output signal becomes less than a reference level set into the detector circuit 34, the circuit 34 disregards the signal and switches internally to maintain its output at a known adjustable value which indicates that there is no load on the motor shaft. When the sampled output $I_5$ signal becomes higher than the set reference level, the detector circuit 34 allows the signal to pass straight to an A input of a comparator circuit 36. An operational amplifier 35 multiplies the amplified motor current $I_5$ signal by a factor greater than 1 before it is applied to a B input of the comparator circuit 36 and compared with the memorized value. The comparator circuit 36 checks the inputs A and B. If input A is greater than B it means that there was a predetermined percentage decrease in the motor load. A time delay circuit 37 delays the output signal from the comparator 36 so that the system does not feel the disturbances of the motor current caused by the load variation when a billet leaves the first stand 1. It is also used to filter peaks of current that may happen because of temperature variation along the billet and therefore load variation on the motor. The pulse duration of a one shot multivibrator circuit 38 defines the sampling time for memorization of new current value, related to the exit of a billet from the first stand 1, and inhibits AND gate 40 during this time duration in order to have another signaling at the moment of the consecutive exit of billets. A flip-flop 39 receives a pulse at its set input from the one shot circuit 38 which keeps its output activated (high) until it is reset by a signal from an OR gate 48. This guarantees that the output of flip-flop 39 remains active until a new positive alteration of load is perceived by the control system. An AND gate 40 inhibits any output for a period of time equivalent to the pulse duration of the one shot circuit 38. A buffer 41 amplifies the output signal from the AND gate 40 so that a relay 42 can be activated. The contacts of relay 42 serve as the interface between the current comparator/analyzer circuit 7 and the strand selector system 8.

An operational amplifier 43 of gain less than 1 operates on the amplified motor current $I_5$, and has its output signal sent to a B input of a comparator circuit 45. A level switching and detector circuit 44 supervises the signal generated in the memorizing circuit 33 and applies its output to the A input of the comparator circuit 45. When the memorized signal becomes greater than the set reference, the detector circuit 44 maintains in its output the memorized value which corresponds to the sampled and held current at the moment of sampling. The comparator circuit 45 verifies inputs A and B. If input A is less than B, it means that there was a predetermined percentage rise of the motor current $I_1$. A time delay 46 delays the output information from the comparator circuit 45 so that the system does not feel disturbances of the motor current caused by load variation when a billet enters in the first stand 1. It is also used to filter current peaks that may occur because of temperature variation along the billet and therefore load variation on the motor. The pulse duration of a one shot multivibrator circuit 47 defines the sampling time for memorization of the current value at the moment of the entrance of another billet in the first stand 1. An OR gate 48 resets the output automatically when a billet enters in the first stand or when the external reset control 51 is actuated. Output contact 52 remains closed when there is a predetermined percentage decrease of the current value, which characterizes the exit of a billet from the first stand 1. The contact remains open when there is a predetermined percentage increase of the current value, which characterizes the entrance of a billet in the first stand 1.

What is claimed is:

1. Apparatus for enabling control of the time gap intervals between successive metal billets in a rolling mill by providing an indication of when to introduce subsequent billets, said mill having a drive motor for moving successive billets from a reheating furnace past a plurality of rolling stands arranged to include one or more strand paths, said apparatus comprising:
   (a) means for sensing predetermined changes in the current of said drive motor and for converting said sensed changes into entrance and exit signals corresponding to the entrance and exit of billets to and from a first stand of said mill;
   (b) at least one preset timer circuit for counting down a presetable time interval corresponding to a desired gap interval upon receipt of an exit signal of said sensing and converting means, and for producing an end of desired interval signal;
   (c) signalling means responsive to said end of desired interval signal for initiating an indication of the desired moment to introduce a billet into said rolling mill first stand;
   (d) a plurality of hot metal sensors for sensing the presence of billets at first and second locations along said plurality of mill stands and in said one or more strand paths for initiating a real time count in at least one chronometer, said count corresponding to the real time presence of said sensed billets within said locations; and
   (e) selector means responsive to said sensing means and to said hot metal sensors for selecting and enabling said at least one reset timer and said at least one chronometer consistent with billet presence in said one or more strand paths.

2. The apparatus of claim 1 wherein said selector means comprises a programmable logic controller responsive to said hot metal sensors for selecting and enabling said one or more chronometers, and said means for converting comprises a sample and hold circuit for periodically determining the magnitude of said drive motor current and a comparator circuit for determining when a predetermined percentage change in motor current has occurred.

3. The apparatus of claim 2 wherein said means for converting further comprises an additional comparator circuit for determining whether said predetermined percentage change in motor current represents an entrance or exit signal.

4. The apparatus of claim 1 wherein said end of desired interval signals are protected from unwanted jitter and variations by one or more time delay circuits between the output of said comparators and the input of said preset timer circuits, and further by filtering and smoothing circuitry between said sensing means and said converting means.

5. The apparatus of claim 1 including means for providing electrical isolation between the various circuit elements, wherein mechanically actuated switching means constitutes the interface between at least said means for converting and said at least one preset timer circuit, and further between said preset timer circuits and said signaling device.

* * * * *